(12) United States Patent
Jung

(10) Patent No.: US 11,532,255 B2
(45) Date of Patent: Dec. 20, 2022

(54) DISPLAY DEVICES

(71) Applicant: Samsung Display Co., Ltd., Yongin (KR)

(72) Inventor: Taehyeog Jung, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/850,220

(22) Filed: Apr. 16, 2020

(65) Prior Publication Data
US 2020/0242992 A1 Jul. 30, 2020

Related U.S. Application Data

(63) Continuation of application No. 15/919,384, filed on Mar. 13, 2018, now Pat. No. 10,650,717, which is a (Continued)

(30) Foreign Application Priority Data

Dec. 4, 2013 (KR) .................. 10-2013-0150134

(51) Int. Cl.
*G09G 3/20* (2006.01)
*G02F 1/1333* (2006.01)
(Continued)

(52) U.S. Cl.
CPC .............. *G09G 3/20* (2013.01); *G02F 1/1345* (2013.01); *G02F 1/133305* (2013.01); *G02F 1/133528* (2013.01); *G09G 2300/04* (2013.01)

(58) Field of Classification Search
CPC ............. G02F 1/133528; G02F 1/1345; G02F 1/133305; G09G 2380/02; G09G 2300/023; G09G 3/2096; G09G 3/20
See application file for complete search history.

(56) References Cited

U.S. PATENT DOCUMENTS

| 5,739,887 A | 4/1998 | Ueda .................. G02F 1/133604 349/149 |
| 6,243,147 B1 | 6/2001 | Sano |

(Continued)

FOREIGN PATENT DOCUMENTS

| CN | 1412781 A | 4/2003 |
| CN | 1984524 A | 6/2007 |

(Continued)

OTHER PUBLICATIONS

European Search Report for European Patent Application No. 19174764.1 dated Nov. 12, 2019.

*Primary Examiner* — Nelson M Rosario
*Assistant Examiner* — Scott D Au
(74) *Attorney, Agent, or Firm* — Cantor Colburn LLP

(57) ABSTRACT

A display device comprises a display substrate, first interconnections, second interconnections, a driving circuit and a polarizing plate. The display substrate includes a bend portion which is curved with respect to an axis parallel to a first direction. The first interconnections extend in the first direction and are on the display substrate. The second interconnections are on the display substrate, connected to the first interconnections and extend in a second direction different from the first direction. The driving circuit is electrically connected to the first interconnections and the second interconnections and provides driving signals to the first interconnections and the second interconnections. The polarizing plate is on the display substrate and overlaps the first interconnections and the second interconnections.

24 Claims, 5 Drawing Sheets

Related U.S. Application Data continuation of application No. 14/293,320, filed on Jun. 2, 2014, now Pat. No. 9,997,094.

(51) Int. Cl.
  *G02F 1/1335* (2006.01)
  *G02F 1/1345* (2006.01)

(56) References Cited

U.S. PATENT DOCUMENTS

| | | |
|---|---|---|
| 7,633,761 B2 | 12/2009 | Kim |
| 8,198,542 B2 | 6/2012 | Lee et al. |
| 8,237,165 B2 | 8/2012 | Kim et al. |
| 8,736,162 B2 | 5/2014 | Jin et al. |
| 8,797,491 B2 | 8/2014 | Kim et al. |
| 9,304,538 B2 | 4/2016 | Aaltonen ............... G06F 1/1601 |
| 9,691,745 B2 | 6/2017 | Hu et al. |
| 2003/0071941 A1 | 4/2003 | Mizuno |
| 2008/0186430 A1 | 8/2008 | Seo ....................... G02B 6/0088 |
| | | 349/65 |
| 2009/0135364 A1 | 5/2009 | Lee ..................... G02F 1/13452 |
| | | 349/149 |
| 2009/0179840 A1 | 7/2009 | Tanaka et al. |
| 2009/0290113 A1 | 11/2009 | Nakahata ............. B32B 38/1866 |
| | | 349/138 |
| 2010/0253604 A1 | 10/2010 | Peters et al. |
| 2010/0293782 A1 | 11/2010 | Yamazaki et al. |
| 2011/0096262 A1 | 4/2011 | Kikuchi .................. G09F 9/301 |
| | | 349/58 |
| 2012/0293470 A1 | 11/2012 | Nakata ..................... H01J 11/12 |
| | | 345/204 |
| 2012/0320509 A1 | 12/2012 | Kim ....................... B32B 17/064 |
| | | 361/679.01 |
| 2013/0002133 A1* | 1/2013 | Jin ....................... H01L 27/3267 |
| | | 313/511 |
| 2013/0002583 A1 | 1/2013 | Jin et al. |
| 2013/0002993 A1 | 1/2013 | Oh .................... G02F 1/133528 |
| | | 349/96 |
| 2013/0034685 A1 | 2/2013 | An et al. |
| 2013/0112984 A1 | 5/2013 | Kim et al. |
| 2013/0278545 A1 | 10/2013 | Cok ........................ G06F 3/044 |
| | | 345/174 |
| 2014/0063719 A1 | 3/2014 | Yamazaki ............. G06F 1/1601 |
| | | 361/679.21 |

FOREIGN PATENT DOCUMENTS

| | | |
|---|---|---|
| CN | 101466195 A | 6/2009 |
| CN | 101496083 A | 7/2009 |
| CN | 101908555 A | 12/2010 |
| CN | 102855821 A | 1/2013 |
| EP | 2051228 A1 | 4/2009 |
| EP | 2541371 A2 | 1/2013 |
| GB | 2134299 A | 8/1984 |
| JP | 2007-334133 A | 12/2007 |
| JP | 2009-003049 A | 1/2009 |
| JP | 2009-008711 A | 1/2009 |
| JP | 2009-300854 A | 12/2009 |
| KR | 1020010096708 A | 11/2001 |
| KR | 1020100121893 A | 11/2010 |
| KR | 1020110106539 A | 9/2011 |
| KR | 101320384 B1 | 10/2013 |
| KR | 1020150001576 A | 1/2015 |

\* cited by examiner

DISPLAY DEVICES

This application is a continuation application of U.S. application Ser. No. 15/919,384 filed Mar. 13, 2018, which is a continuation application of U.S. application Ser. No. 14/293,320 filed Jun. 2, 2014 and issued as U.S. Pat. No. 9,997,094 on Jun. 12, 2018, which claims priority to Korean Patent Application No. 10-2013-0150134, filed on Dec. 4, 2013, and all the benefits accruing therefrom under 35 U.S.C. § 119, the disclosure of which is hereby incorporated by reference in its entirety.

BACKGROUND

(1) Field

The invention relates to display devices and, more particularly, to display devices capable of reducing an occurrence of cracks in interconnections thereof

(2) Description of the Related Art

Display devices include a liquid crystal display device, an electrowetting display device, and an electrophoretic display device, etc. A display device may include pixels and interconnections having data lines and gate lines. The pixels and the interconnections are provided in a display panel of the display device. The pixels may be alternately connected to the data lines adjacent to the pixels for inversion driving of the display device.

Display devices have been developed to have curved portions. However, in the event that the display devices have the curved portions, interconnections on the curved portions receive tension. Thus, cracks may occur in the interconnections disposed on the curved portions, so that improved display devices and methods thereof capable of reducing an occurrence of cracks in the interconnections are desired.

SUMMARY

One or more exemplary embodiment of the invention provides display devices capable of reducing an occurrence of cracks in interconnections thereof.

An exemplary embodiment of the invention provides a display device including a display substrate, first interconnections, second interconnections, a driving circuit and a polarizing plate. The display substrate includes a bend portion which is curved with respect to an axis parallel to a first direction. The first interconnections extend in the first direction and are on the display substrate. The second interconnections are connected to the first interconnections and extend in a second direction different from the first direction. The second interconnections are on the display substrate. The driving circuit is electrically connected to the first interconnections and the second interconnections and provides driving signals to the first interconnections and the second interconnections. The polarizing plate is on the display substrate. The polarizing plate overlaps the first interconnections and the second interconnections.

The display substrate may further include a non-bend portion which is not curved with respect to the axis parallel to the first direction.

The first interconnections may include first bend interconnections on the bend portion, and first non-bend interconnections on the non-bend portion.

The second interconnections may include second bend interconnections connected to the first bend interconnections, and second non-bend interconnections connected to the first non-bend interconnections.

The second bend interconnections may include third interconnections on the non-bend portion and connected to the driving circuit, and fourth interconnections on the bend portion and connected to the third interconnections and the first bend interconnections.

The polarizing plate may include a quadrilateral region, and a protrusion region protruding from a side of the quadrilateral region. The quadrilateral region may overlap the first bend interconnections, and the protrusion region may overlap the fourth interconnections. The protrusion region may have a triangular shape, a quadrilateral shape, a polygonal shape, a circular shape, a semicircular shape or an elliptical shape.

The protrusion region may include a first protrusion protruding from the side of the quadrilateral region at a first end portion thereof, and a second protrusion protruding from the side of the quadrilateral region at a second end portion thereof. The first protrusion and the second protrusion may have the same shape or different shapes from each other. The first and second protrusions may overlap the fourth interconnections.

The first and second interconnections may be data lines, the driving signals may include data signals, and the driving circuit part may include a data driver which provides the data signals to the data lines.

The display device may further include gate lines insulated from the data lines, and a gate driver which provides gate signals to the gate lines.

The driving circuit may include a base film, and a driving circuit chip mounted on the base film. The base film may be flexible.

The display substrate may include a plurality of bend portions.

The display device may further include a lower protection film on the display substrate and opposite to the polarizing plate with respect to the display substrate. The lower protection film may have the same shape as the display substrate.

BRIEF DESCRIPTION OF THE DRAWINGS

The above and other features and advantages of the invention will become more apparent in view of the attached drawings and accompanying detailed description, in which.

DETAILED DESCRIPTION

Figure 1:
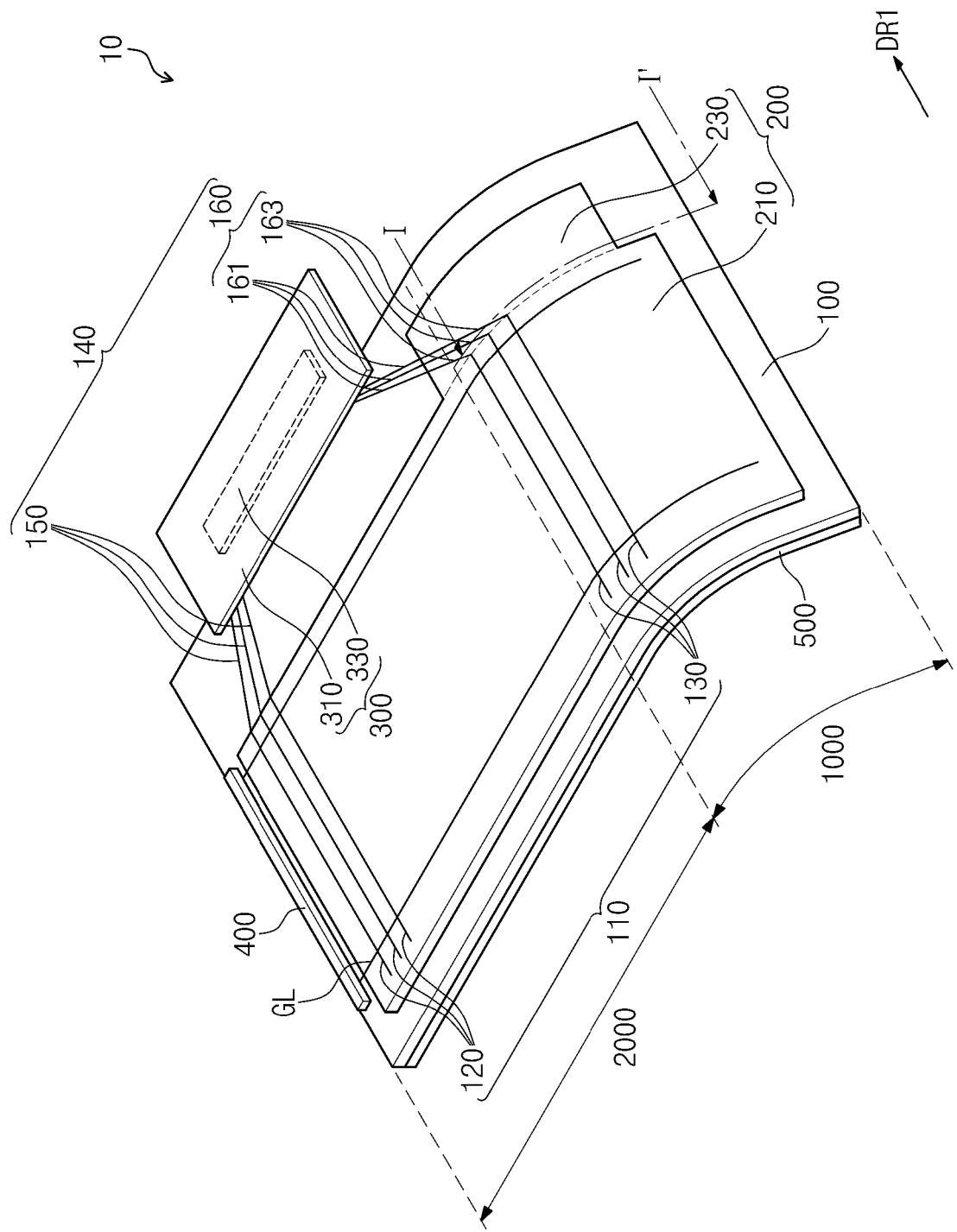
FIG. 1 is a perspective view illustrating an exemplary embodiment of a display device according to the invention.

The invention will now be described more fully hereinafter with reference to the accompanying drawings, in which exemplary embodiments of the invention are shown. The advantages and features of the invention and methods of achieving them will be apparent from the following exemplary embodiments that will be described in more detail with reference to the accompanying drawings. It should be noted, however, that the invention are not limited to the following exemplary embodiments, and may be implemented in various forms. Accordingly, the exemplary embodiments are provided only to disclose the invention and let those skilled in the art know the category of the invention. In the drawings, exemplary embodiments of the invention are not limited to the specific examples provided herein and are exaggerated for clarity.

The terminology used herein is for the purpose of describing particular exemplary embodiments only and is not intended to limit the invention. As used herein, the singular terms "a," "an" and "the" are intended to comprise the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof. As used herein, the term "and/or" comprises any and all combinations of one or more of the associated listed items.

It will be understood that when an element is referred to as being "connected" or "coupled" to another element, it may be directly connected or coupled to the other element or intervening elements may be present. Similarly, it will be understood that when an element such as a layer, region or substrate is referred to as being "on" another element, it can be directly on the other element or intervening elements may be present. In contrast, the term "directly" means that there are no intervening elements. As used herein, connected may refer to elements being physically and/electrically connected to each other.

Additionally, the embodiment in the detailed description will be described with sectional views as ideal exemplary views of the invention. Accordingly, shapes of the exemplary views may be modified according to manufacturing techniques and/or allowable errors. Therefore, the exemplary embodiments of the invention are not limited to the specific shape illustrated in the exemplary views, but may include other shapes that may be created according to manufacturing processes. Areas exemplified in the drawings have general properties, and are used to illustrate specific shapes of elements. Thus, this should not be construed as limited to the scope of the invention.

It will be also understood that although the terms first, second, third etc. may be used herein to describe various elements, these elements should not be limited by these terms. These terms are only used to distinguish one element from another element. Thus, a first element in some exemplary embodiments could be termed a second element in other exemplary embodiments without departing from the teachings of the present invention. Exemplary embodiments of the invention explained and illustrated herein include their complementary counterparts. The same reference numerals or the same reference designators denote the same elements throughout the specification.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments of a display device according to the invention will be described hereinafter.

FIG. 1 is a perspective view illustrating an exemplary embodiment of a display device according to the invention.

Referring to FIG. 1, a display device 10 includes a display substrate 100, first interconnections 110, second interconnections 140, a driving circuit part 300 (otherwise referred to as a driver) and a polarizing plate 200.

The display device 10 may be flexible. In an exemplary embodiment, for example, the display device 10 may be one selected from, but not limited to, a flexible liquid crystal display device, a flexible organic light emitting display device, a flexible electrophoretic display device and a flexible electrowetting display device. The display device 10 of the organic light emitting display device will be described as an example in detail. However, the invention is not limited thereto.

Even though not shown in FIG. 1, the display substrate 100 may include a lower substrate, and a thin film transistor substrate disposed on the lower substrate. The lower substrate may be, but not limited to, a glass substrate, a quartz substrate or a plastic substrate. The thin film transistor substrate may be disposed on the lower substrate and may include a thin film transistor and an anode. The thin film transistor and the anode may be used in order to apply an electric field to an organic light emitting layer.

Additionally, even though not shown in FIG. 1, the display substrate 100 may further include the organic light emitting layer and an upper substrate. The organic light emitting layer is disposed between the thin film transistor substrate and the upper substrate. The upper substrate may be, but not limited to, a glass substrate, a quartz substrate or a plastic substrate. Light may be emitted from the organic light emitting layer by an electric field generated between the anode disposed on the thin film transistor substrate and a cathode disposed on the upper substrate.

The display substrate 100 includes a bend portion 1000 curved with respect to an axis parallel to a first direction DR1 of FIG. 1. A shape or cross-sectional profile of the bend portion 1000 may be, but not limited to, a polygonal shape (e.g., a triangle-shape or a quadrangle-shape) or a shape having curvature (e.g., a circular shape, an elliptical shape or a semicircular shape). The first direction DR1 is illustrated parallel to a short side of the display substrate 100, but the invention is not limited thereto.

The bend portion 1000 may include a portion of a display region (not shown) in which an image is displayed, or an entire portion of the bend portion 1000 may be a non-display region (not shown) in which an image is not displayed.

The display substrate 100 may further include a non-bend portion 2000 that is not deformed but is substantially flat or planar. The non-bend portion 2000 may include the display region (not shown) in which the image is displayed.

The display device 10 includes the first interconnections 110 and the second interconnections 140. The first interconnections 110 and the second interconnections 140 are disposed on the display substrate 100. The first interconnections 110 extend in the first direction DR1, and the second interconnections 140 extend in a second direction different from the first direction DR1. Extending directions of the second interconnections 140 are defined as the second direction for the purpose of ease and convenience in explanation. However, the extending directions of the second interconnections 140 are not necessarily parallel to each other, under the condition that the extending directions of the second interconnections 140 are different from the first direction DR1. In other words, the second interconnections 140 may extend in the same direction or may extend in different directions from each other, under the condition that the extending directions of the second interconnections 140 are different from the first direction DR1.

Additionally, the first interconnections 110 are connected to the second interconnections 140, and the first and second interconnections 110 and 140 receive driving signals from the driving circuit part 300.

A portion of the first interconnections 110 and a portion of the second interconnections 140 may be disposed on the bend portion 1000.

The first interconnections 110 include first bend interconnections 130 disposed on the bend portion 1000 and first non-bend interconnections 120 disposed on the non-bend portion 2000.

The second interconnections 140 include second bend interconnections 160 connected to the first bend interconnections 130 and second non-bend interconnections 150 connected to the first non-bend interconnections 120. Portions of the second bend interconnections 160 may be disposed on the bend portion 1000, and remaining portions of the second bend interconnections 160 may be disposed on the non-bend portion 2000. The second bend interconnections 160 include third interconnections 161 and fourth interconnections 163. The third interconnections 161 are disposed on the non-bend portion 2000 and are connected to the driving circuit part 300. The fourth interconnections 163 are disposed on the bend portion 1000 and are connected to the third interconnections 161 and the first bend interconnections 130.

The display device 10 includes the polarizing plate 200. The polarizing plate 200 is disposed on the display substrate 100 and covers a portion of the first interconnections 110 and a portion of the second interconnections 140.

The polarizing plate 200 may include a quadrilateral region 210, and a protrusion region 230 protruding from a side of the quadrilateral region 210. The quadrilateral region 210 may be disposed on the bend portion 1000 and not on the non-bend portion 200, or may be disposed on the bend portion 1000 and the non-bend portion 2000.

The quadrilateral region 210 may cover a portion of the first interconnections 110 disposed on the bend portion 1000 and may also cover a portion of the second interconnections 140 connected to the first interconnections 110.

A portion of the protrusion region 230 covers the fourth interconnections 163.

Figure 2:
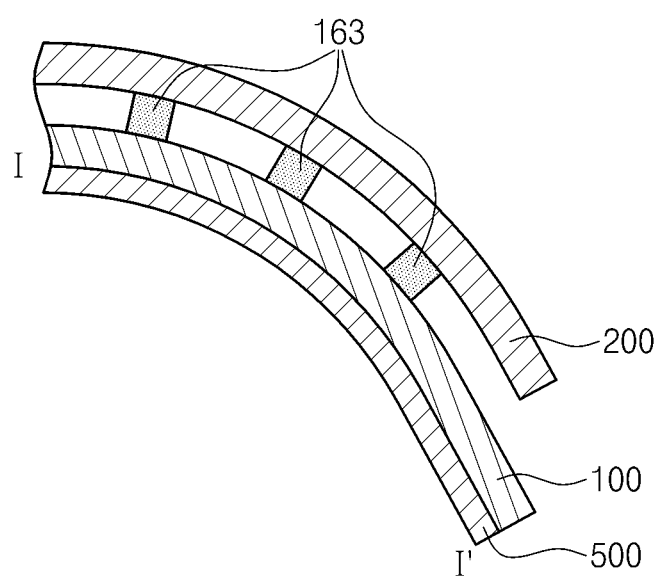
FIG. 2 is a cross-sectional view taken along line I-I' of FIG. 1.
Figure 3A:
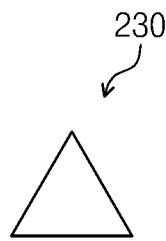
FIG. 3(A) to FIG. 3(E) are diagrams illustrating exemplary embodiments of shapes of a protrusion region of a display device according to the invention.
Figure 3B:
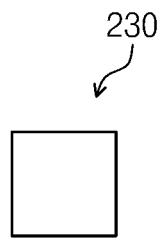
Figure 3C:
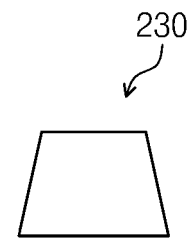
Figure 3D:
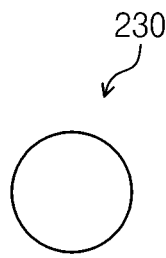
Figure 3E:
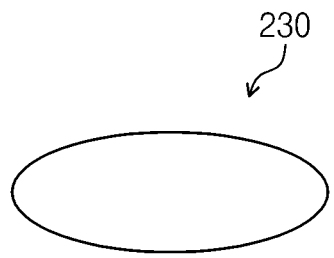

FIG. 2 is a cross-sectional view taken along line I-I' of FIG. 1.

The bend portion 1000 is deformed with respect to the axis parallel to the first direction DR1. Thus, the fourth interconnections 163 receive tension generated by the bend portion 1000 such that cracks may occur in the fourth interconnections 163. Referring to FIG. 2, the polarizing plate 200 covers the fourth interconnections 163 in the display device 10, so that the fourth interconnections 163 may be disposed in a neutral plane when viewed from a cross-sectional view. Since the fourth interconnections 163 are disposed in the neutral plane, the tension generated by the bend portion 1000 may be reduced. Thus, it is possible to reduce occurrence of the cracks of the fourth interconnections 163.

FIG. 3 is a diagram illustrating exemplary embodiments of shapes of a protrusion region of a display device according to the invention. The protrusion region 230 of the polarizing plate 200 has a shape that covers the fourth interconnections 163 such that the fourth interconnections 163 are disposed in the neutral plane when viewed from a cross-sectional view. Referring to FIG. 3(A) to FIG. 3(E), a planar or top plan view of the shape of the protrusion region 230 of the polarizing plate 200 may be selected from, but not limited to, a triangular shape (FIG. 3A), a quadrilateral shape (FIG. 3B), a polygonal shape (FIG. 3C), a circular shape (FIG. 3D), a semicircular shape, and an elliptical shape (FIG. 3E).

Referring again to FIG. 1, the driving circuit part 300 may be electrically connected to the first interconnections 110 and the second interconnections 140 and may provide the driving signals to the first interconnections 110 and the second interconnections 140.

In an exemplary embodiment, the first interconnections 110 and the second interconnections 140 may be data lines, and the driving signals may include data signals. The driving circuit part 300 may include a data driver (not shown) providing the data signals to the data lines.

The display device 10 may further include gate lines GL insulated from the data lines, and a gate driver 400 providing gate signals to the gate lines GL. The gate driver 400 may be disposed on the display substrate 100 or the driving circuit part 300 may include the gate driver 400 therein.

Referring to FIG. 1, the driving circuit part 300 may include a base film 310, and a driving circuit chip 330 mounted on the base film 310. The base film 310 may be flexible.

The display device 10 may further include a lower protection film 500 disposed under the display substrate 100. The lower protection film 500 may have the same shape as the display substrate 100, in the top plan and/or cross-sectional view. The lower protection film 500 may include an organic material and/or an inorganic material.

The display device 10 may further include an upper protection film (not shown) disposed on the polarizing plate 200. The upper protection film may have the same shape as the polarizing plate 200 and/or the display substrate 100, such as in the top plan and/or cross-sectional view. The upper protection film may include an organic material and/or an inorganic material.

In the display device 10 according to the illustrated exemplary embodiment, the polarizing plate 200 covers the fourth interconnections 163 such that the fourth interconnections 163 are disposed in the neutral plane in a cross-sectional view. Thus, when the display device 10 is bent, the tension applied to the fourth interconnections 163 may be reduced. As a result, reduction of cracks that may occur in the fourth interconnections 163 is possible.

Next, another exemplary embodiment of a display device according to the invention will be described. Hereinafter, differences between the exemplary embodiments of the display devices will be mainly described in detail, and the same descriptions will be omitted or mentioned briefly for the purpose of ease and convenience in explanation.

Figure 4:
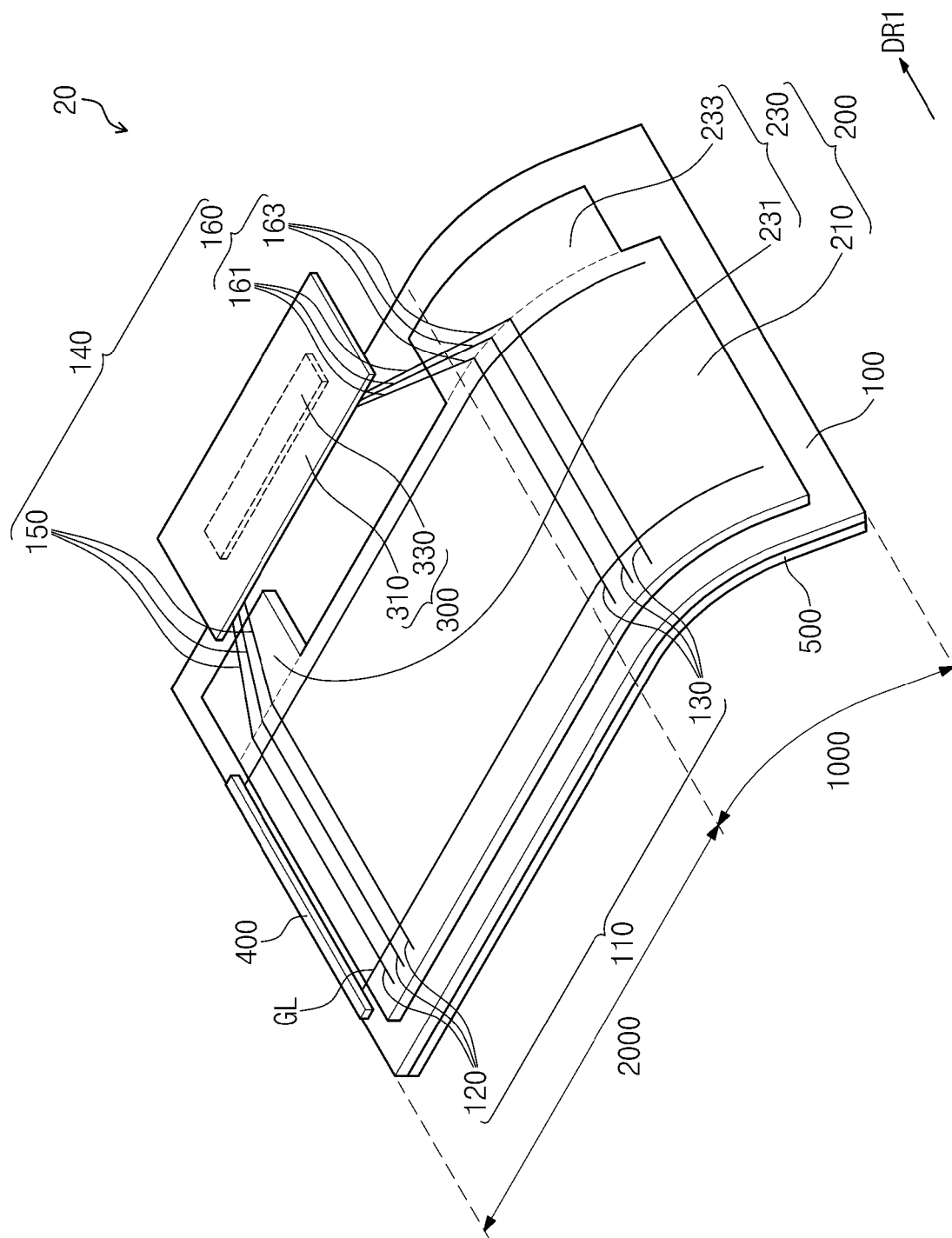
FIG. 4 is a perspective view illustrating another exemplary embodiment of a display device according to the invention.

FIG. 4 is a perspective view illustrating another exemplary embodiment of a display device 20 according to the invention.

Referring to FIG. 4, the display device 20 includes a display substrate 100, first interconnections 110, second interconnections 140, a driving circuit part 300 and a polarizing plate 200.

The polarizing plate 200 may include a quadrilateral region 210, and a protrusion region 230 protruding from a side of the quadrilateral region 210. The quadrilateral region 210 may be disposed on the bend portion 1000 and not on the non-bend portion 2000, or may be disposed on the bend portion 1000 and the non-bend portion 2000.

The polarizing plate 200 is disposed on the display substrate 100 and covers a portion of the first interconnections 110 and a portion of the second interconnections 140.

The protrusion region 230 of the polarizing plate 200 may include a first protrusion 231 protruding at a first end portion of the side of the quadrilateral region 210, and a second protrusion 233 protruding at a second end portion of the side of the quadrilateral region 210.

A portion of the second protrusion 233 may cover the fourth interconnections 163, while a portion of the first protrusion 231 may cover the second non-bend interconnections 150 connected to the first non-bend interconnections 120.

As mentioned above, the protruding region 230 in the bend portion 1000 has shapes that cover the fourth interconnections 163 to locate the fourth interconnections 163 in the neutral plane when viewed from a cross-sectional view. The illustrated exemplary embodiment includes a protrusion in both the bend and non-bend portions 1000 and 2000. In contrast, the exemplary embodiment in FIG. 1 includes a protrusion in only the bend portion 1000, but the invention is not limited thereto.

The shapes of the first and second protrusions 231 and 233 may be selected from, but not limited to, a triangular shape, a quadrilateral shape, a polygonal shape, a circular shape, a semicircular shape and an elliptical shape. The first protrusion 231 and the second protrusion 233 of the polarizing plate 200 may have the same shape or may have different shapes from each other.

In the display device 20 according to the illustrated exemplary embodiment, the polarizing plate 200 covers the fourth interconnections 163 such that the fourth interconnections 163 are disposed in the neutral plane in a cross-sectional view. Thus, the tension applied to the fourth interconnections 163 may be reduced when the display device 10 is bent. As a result, reduction of cracks that may occur in the fourth interconnections 163 is possible.

Next, still another exemplary embodiment of a display device according to the invention will be described. Hereinafter, differences between exemplary embodiments will be mainly described in detail, and the same descriptions will be omitted or mentioned briefly for the purpose of ease and convenience in explanation.

Figure 5:
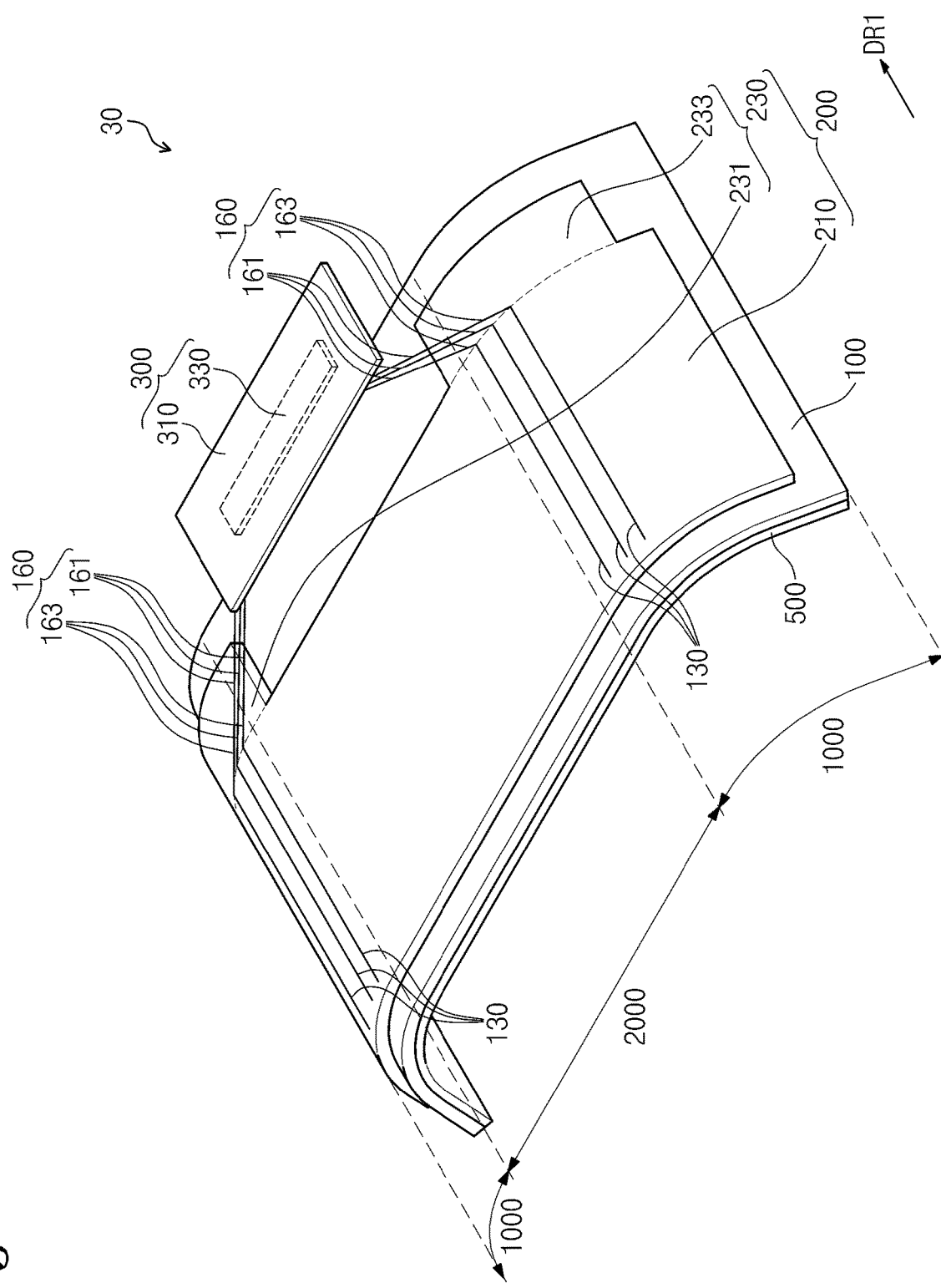
FIG. 5 is a perspective view illustrating still another exemplary embodiment of a display device according to the invention.

FIG. 5 is a perspective view illustrating still another exemplary embodiment of a display device 30 according to the invention.

Referring to FIG. 5, the display device 30 includes a display substrate 100, first interconnections 110, second interconnections 140, a driving circuit part 300 and a polarizing plate 200. The display device 30 includes a plurality of bend portions 1000.

The polarizing plate 200 may include a quadrilateral region 210, and a protrusion region 230 protruding from a side of the quadrilateral region 210. The quadrilateral region 210 may be disposed on the bend portion 1000 and not on the non-bend portion 2000, or may be disposed on the bend portion 1000 and the non-bend portion 2000.

FIG. 5 shows the first interconnections 110 disposed on the bend portion 1000 as the first bend interconnections 130. However, the invention is not limited thereto. In other exemplary embodiments, the first interconnections 110 may also be disposed on the non-bend portion 2000, as the first non-bend interconnections 120, as shown in FIG. 1. Similarly, FIG. 5 shows the second interconnections 140 disposed on the bend portion 1000 as the second bend interconnections 163. However, the invention is not limited thereto. In other exemplary embodiments, the second interconnections 140 may also be disposed on the non-bend portion 2000, as the second non-bend interconnections 150, as shown in FIG. 1.

The polarizing plate 200 is disposed on the display substrate 100 and covers a portion of the first interconnections 110 and a portion of the second interconnections 140.

The protrusion region 230 of the polarizing plate 200 may include a first protrusion 231 protruding at a first end portion of the side of the quadrilateral region 210, and a second protrusion 233 protruding at a second end portion of the side of the quadrilateral region 210. That is, the protrusions of the polarizing plate 200 are disposed at each bend portion 1000, but the invention is not limited thereto.

In the display device 30 according to the illustrated exemplary embodiment, the polarizing plate 200 covers the fourth interconnections 163 such that the fourth interconnections 163 are disposed in the neutral plane in a cross-sectional view. Thus, the tension applied to the fourth interconnections 163 may be reduced when the display device 10 is bent. As a result, reduction of cracks that may occur in the fourth interconnections 163 is possible.

According to one or more exemplary embodiment of the invention, occurrence of cracks of the interconnections at a bend portion may be reduced or minimized.

While the invention has been described with reference to exemplary embodiments, it will be apparent to those skilled in the art that various changes and modifications may be made without departing from the spirit and scope of the invention. Therefore, it should be understood that the above exemplary embodiments are not limiting, but illustrative. Thus, the scope of the invention is to be determined by the broadest permissible interpretation of the following claims and their equivalents, and shall not be restricted or limited by the foregoing description.

What is claimed is:

1. A display device comprising:
   a display substrate comprising:
      a bend portion which is curved with respect to an axis parallel to a first direction, and
      a non-bend portion which is not curved with respect to the axis parallel to the first direction;
   a plurality of wires on the display substrate;
   a driving circuit which provides driving signals to the plurality of wires; and
   a polarizing plate on the display substrate, the polarizing plate comprising:
      a first part on the bend portion;
      a second part on the non-bend portion;
      the first part curved from the second part with respect to a bend axis parallel to the first direction and having a first length parallel to the bend axis; and the second part having a second length parallel to the bend axis,
wherein the first length of the polarizing plate is larger than the second length of the polarizing plate,
wherein the plurality of wires comprises:
at least one first wire which overlaps the second part of the polarizing plate; and
at least one second wire which overlaps the first part of the polarizing plate.

2. The display device of claim 1, wherein
each of the at least one first wire and the at least one second wire includes a first wire part, and a second wire part which is between the first wire part and the driving circuit, and
the second wire part includes an oblique portion.

3. The display device of claim 2, wherein the polarizing plate overlaps the first wire parts and a portion of the second wire parts.

4. The display device of claim 1, wherein
a first distance along the first direction between the bend portion and the first part, at an edge adjacent to the driving circuit, is smaller than a second distance along the first direction between the non-bend portion and the second part, at the edge.

5. The display device of claim 1, wherein the polarizing plate includes a recess part recessed toward a center of the display substrate.

6. The display device of claim 5, wherein the second part includes the recess part.

7. The display device of claim 5, wherein the recess part is disposed corresponding to the driving circuit.

8. The display device of claim 7, wherein
a second direction crosses the first direction, and
a width of the recess part in the second direction is larger than a width of the driving circuit in the second direction.

9. The display device of claim 1, wherein the bend portion includes:
a first bend portion adjacent to one side of the non-bend portion, and
a second bend portion adjacent to the other side of the non-bend portion.

10. The display device of claim 1, wherein the plurality of wires are disposed between the display substrate and the polarizing plate.

11. A display device comprising:
a display substrate comprising:
a bend portion which is curved with respect to an axis parallel to a first direction, and
a non-bend portion which is not curved with respect to the axis parallel to the first direction;
a plurality of wires on the display substrate;
a driving circuit which provides driving signals to the plurality of wires; and
a polarizing plate on the display substrate, the polarizing plate comprising:
a first part on the bend portion and having a first length parallel to the first direction;
a second part on the non-bend portion and having a second length parallel to the first direction; and
a third part between the first part and the second part and having a third length parallel to the first direction, the third length increasing from the second part to the first part, wherein
the plurality of wires comprises:
a plurality of first wires each extending in the first direction, and
a plurality of second wires between the first wires and the driving circuit, and
the first length of the polarizing plate is larger than the second length of the polarizing plate.

12. A display device comprising:
a display substrate comprising:
a bend portion which is curved with respect to an axis parallel to a first direction, and
a non-bend portion; and
a polarizing plate on the display substrate, the polarizing plate comprising:
a first part on the bend portion;
a second part on the non-bend portion; and
a third part on the non-bend portion between the first part and the second part, wherein
the first part is curved with respect to the axis, and the first part has a first length parallel to the first direction,
the second part has a second length parallel to the first direction,
the third part has a third length parallel to the first direction, and
the first length of the polarizing plate is larger than the second length of the polarizing plate.

13. The display device of claim 12, wherein the third length of the polarizing plate is larger than the second length of the polarizing plate.

14. The display device of claim 12, wherein the polarizing plate includes a recess part recessed toward a center of the display substrate.

15. The display device of claim 14, wherein the second part includes the recess part.

16. The display device of claim 15, further comprising a driving circuit disposed at one side of the display substrate,
wherein the recess part is disposed corresponding to the driving circuit.

17. The display device of claim 16, wherein a first distance along the first direction between the bend portion and the first part, at an edge adjacent to the driving circuit, is smaller than a second distance along the first direction between the non-bend portion and the second part, at the edge.

18. The display device of claim 12, wherein the bend portion includes:
a first bend portion adjacent to one side of the non-bend portion, and
a second bend portion adjacent to the other side of the non-bend portion.

19. The display device of claim 12, wherein the display substrate includes:
a lower substrate;
a thin film transistor substrate on the lower substrate; and
an organic light emitting layer on the thin film transistor substrate.

20. The display device of claim 12, wherein the bend portion comprises a display region.

21. A display device comprising:
a substrate comprising:
a non-bend portion; and
a bend portion which is adjacent to the non-bend portion in a first direction and curved with respect to the non-bend portion, and
a polarizing layer on the substrate, the polarizing layer comprising:
a first part on the bend portion; and
a second part on the non-bend portion, wherein
the first part is curved with respect to the second part, and the second part includes a recess part recessed in a direction different from the first direction and toward a center of the substrate.

22. The display device of claim 21, further comprising a driving circuit disposed at one side of the substrate,
wherein the recess part is disposed corresponding to the driving circuit.

23. The display device of claim 21, wherein the substrate includes:
a lower substrate;
a thin film transistor substrate on the lower substrate; and
an organic light emitting layer on the thin film transistor substrate.

24. The display device of claim 21, wherein the bend portion comprises a display region.

* * * * *